United States Patent [19]

Jamison

[11] Patent Number: 4,486,319

[45] Date of Patent: Dec. 4, 1984

[54] MICROPOROUS IONOMER POLYMER LUBRICATING COMPOSITION

[75] Inventor: Warren E. Jamison, Evergreen, Colo.

[73] Assignee: Armco, Inc., Middletown, Ohio

[21] Appl. No.: 424,812

[22] Filed: Sep. 27, 1982

[51] Int. Cl.³ .............................................. C10M 1/26
[52] U.S. Cl. .................. 252/12.2; 252/56 S; 260/DIG. 31; 525/330.6
[58] Field of Search ............................. 252/12.2, 56 S; 525/330.6; 260/DIG. 31

[56] References Cited

U.S. PATENT DOCUMENTS 3,264,272  8/1966  Rees ................................. 525/330.6
4,361,676  11/1982  Simpson ........................... 252/56 S

*Primary Examiner*—Jacqueline V. Howard
*Attorney, Agent, or Firm*—O'Rourke & Harris

[57] ABSTRACT

A microporous lubricating composition is disclosed that includes an ionomer polymer and a liquid lubricant. The ionomer polymer can be combined with other polymers and the composition can include various additives to modify the performance and properties of the formed composition. The formed composition is useful for lubrication of mechanical components including wire rope and bearings such as journal bearings.

23 Claims, 4 Drawing Figures

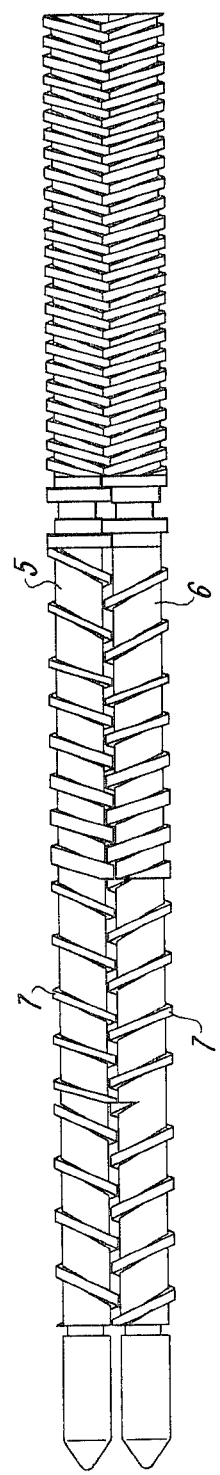
Fig—1
(PRIOR ART)
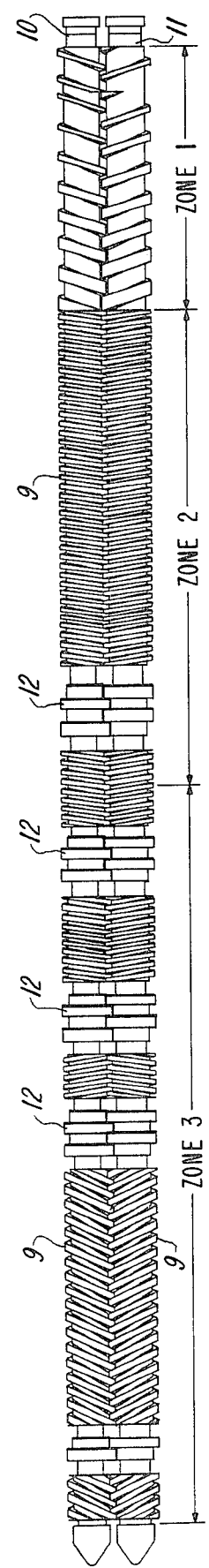
Fig—2

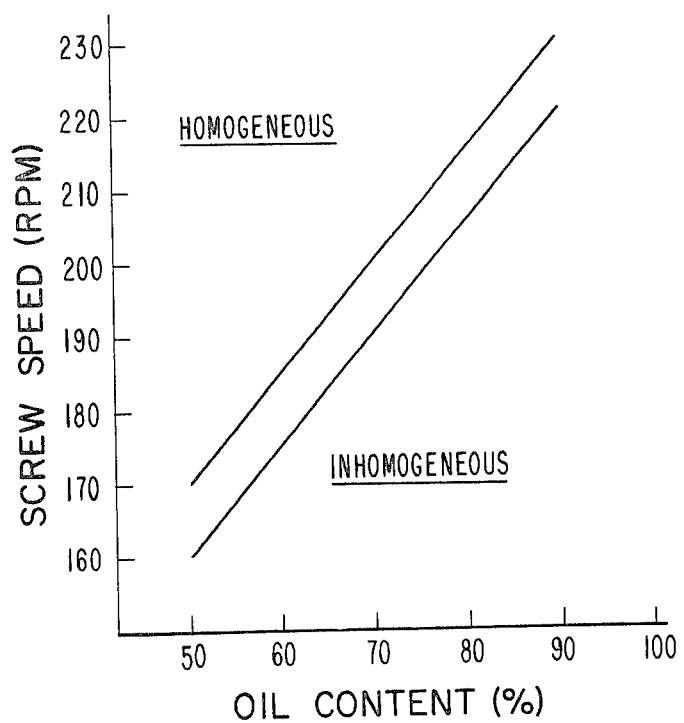
Fig_4

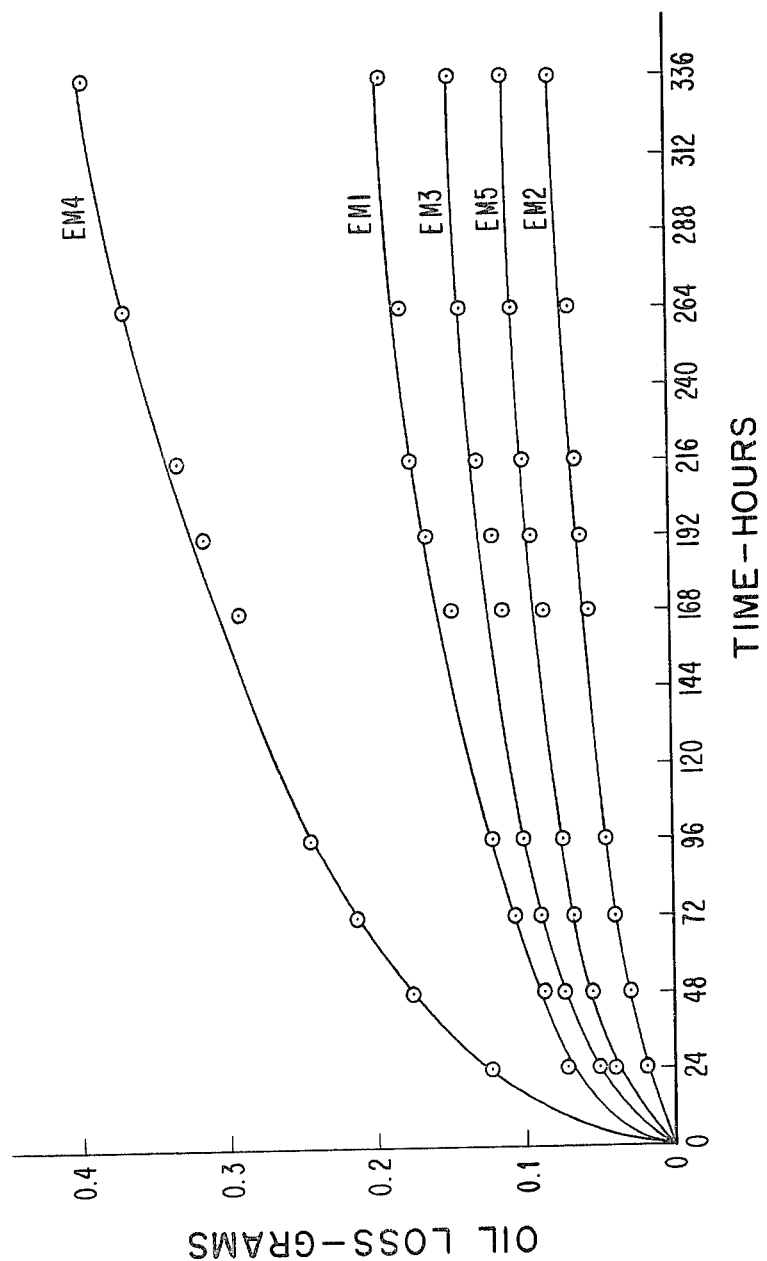

MICROPOROUS IONOMER POLYMER LUBRICATING COMPOSITION

FIELD OF THE INVENTION

This invention relates to a microporous polymer lubricating composition and, more particularly, relates to microporous polymer lubricating compositions formed from an ionomer polymer.

BACKGROUND OF THE INVENTION

Various compositions have heretofore been developed for lubricating purposes, and such compositions have included various carriers which retain lubricating oils. Compositions have also been heretofore developed in which significant amounts of lubricating oils are retained within a network of microscopic interconnected pores in a polymer matrix, and said compositions have been employed in the lubrication industry as lubricant reservoirs and dispensing media.

Compositions in which such a polymer matrix is polyethylene is shown, for example, in U.S. Pat. Nos. 3,541,011, 3,547,819 and 3,729,415, while compositions in which the polymer matrix is polymethylpentene is shown, for example, in U.S. Pat. No. 4,146,487. In addition, compositions in which the thermal properties are modified by the addition of solid powders is shown in U.S. Pat. No. 4,239,632.

With respect to the compositions set forth, the method of manufacture requires reduction of the polymeric material to a powder form, preparing a physical mixture of the ingredients (i.e., the polymer powder, additive powders and the lubricating oil), and then heating the mixture in a mold to create the desired end form of the composition.

Lubricating compositions such as described hereinabove have been shown to have useful application, for example, in U.S. Pat. Nos. 4,280,571, 4,342,491 and 4,344,278, the latter two of which are directed to lubrication of journal bearings and wire rope, respectively. In U.S. Pat. No. 4,280,571, further processing of the compositions is shown by using a plastics injection molding machine, while in U.S. Pat. Nos. 4,342,491 and 4,344,278, the compositions are shown to be processed by using a plastics extrusion machine.

Ionic hydrocarbon polymers are described in U.S. Pat. No. 3,264,272, and a description of ionomer is set forth in Modern Plastics Encyclopedia (McGraw-Hill, Inc.).

SUMMARY OF THE INVENTION

This invention provides an improved microporous polymer lubricating composition that includes an ionomer polymer and a liquid lubricant. The formed composition is useful for lubrication of mechanical components and is particularly useful for lubricating wire rope and bearings such as journal bearings.

It is therefore an object of this invention to provide an improved microporous polymer lubricating composition.

It is another object of this invention to provide an improved microporous polymer lubricating composition formed from an ionomer polymer.

It is still another object of this invention to provide an improved microporous polymer lubricating composition that includes an ionomer polymer and a liquid lubricant.

It is yet another object of this invention to provide an improved microporous polymer lubricating composition that is useful in lubricating mechanical components.

It is still another object of this invention to provide an improved microporous polymer lubricating composition that is particularly useful for lubricating wire rope and bearings such as journal bearings.

With these and other objects in view, which will become apparent to one skilled in the art as the description proceeds, this invention resides in the novel construction, combination, composition and arrangement of parts substantially as hereinafter described and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings, together with the written specification, illustrate a complete embodiment of the invention according to the best mode so far devised for the practical application of the principles thereof, and in which:

FIG. 1 is a partial side view illustrating a conventional screw set for compounding plastic ingredients;

FIG. 2 is a partial side view illustrating a high shear screw set preferred for compounding the composition of this invention;

FIG. 3 is a graphical presentation illustrating lubricating oil loss over measured periods of time utilizing compositions formed according to this invention with said compositions being in the form of plugs one-half inch in diameter and one-half inch in length under 100 psi axial compression; and FIG. 4 is a graphical presentation illustrating screw speed v. oil content necessary to produce a homogeneous microporous lubricating composition comprising an ionomer and a lubricating position utilizing a screw set as shown in FIG. 2.

DESCRIPTION OF THE INVENTION

In this invention, a polymer matrix is formed from an ionomer polymer with the polymer matrix having a liquid lubricant therein. The ionomer polymer may be utilized alone or in combination with other polymers, such as, for example, polyethylene, or polypropylene. In addition, various solid and/or liquid additives, may be added, as needed to modify the physical and mechanical properties of the composition and the lubricating properties of the liquid lubricant.

In practice, the ingredients are combined and the composition is processed in a manner to create a network of interconnecting, microscopic pores within the polymer matrix structure, which pores are filled with the liquid lubricant. Additives may be incorporated in the polymer phase, in the liquid lubricant phase, or in both.

The composition is formed to the desired configuration to be placed within or adjacent to the mechanical component requiring periodic or continuous lubrication. After such positioning, the composition physically protects the mechanical component from damage due to external causes such as mechanical damage that might otherwise occur due to impact of foreign bodies, and from corrosion damage that might otherwise occur due to exposure to corrosive media. The composition also protects the liquid lubricant from contamination with dirt and dust, from oxidation due to exposure to air at high temperatures, and from dilution with foreign liquids.

The composition releases the liquid lubricant to the mechanical component requiring lubrication through the individual or combined actions of heat, mechanical pressure and capillary action. The composition reabsorbes excess liquid lubricant when the releasing forces are removed.

The ionomer polymers used in the preferred embodiment of this invention are terpolymers of isobutylacrylate, methacrylic acid and ethylene. Other ionomers also useful in this invention are copolymers of ethylene and sodium or zinc salts of methacrylic acid. In particular, the ionomers used in this invention have Melt Flow Indicies (ASTM method D-1238) between 0.5 and 10.0 grams per 10 minutes. The lower the Melt Flow Index, the higher the abrasion resistance of the composition. The liquid lubricants include hydrocarbon, diester and silicone oils of lubricating viscosities.

The composition may contain from 10 to 80 percent by weight of the liquid lubricant (including the liquid additives), and from 20 to 90 percent by weight of the ionomer (including solid additives). Solid additives include calcium carbonate, mica, titanium dioxide and other mineral powders used to stiffen and harden the composition, molybdenum disulfide, polytetrafluoroethylene, and similar solid lubricant powders used to provide inherent lubricity, and hollow glass spheres to decrease the density of the composition. Solid additives may also include glass and graphite fibers and fibers of polymers and other materials used to strengthen plastics, and absorbent organic fibers used to increase the oil content and improve the oil retention and release properties of the composition. Liquid additives include additive materials commonly employed in the lubrication industry to enhance the lubrication properties of oils.

While the ingredients may be compounded in a conventional mixing apparatus (such as made by American Leistritz, Baker-Perkins and Werner and Pfleiderer, for example), the preferred processing method, at least in some instances, is to compound the ingredients in a high shear, intermeshing, counterrotating, compounding twin screw extruder. FIG. 1 illustrates a standard screw configuration found in an American Leistritz extruder for compounding ordinary plastics, and a high shear screw configuration is illustrated in FIG. 2. As can be appreciated from a comparison of FIGS. 1 and 2, conventional screws 5 and 6 (as shown in FIG. 1) have raised flights 7 that are more widely spaced than the raised flights 9 of high shear screws 10 and 11 (as shown in FIG. 2). The purpose of these screws is to convey the plastic (polymer) through a heated barrel to knead or masticate the plastic, thereby heating it to a viscous state, to incorporate additives such as colorants and fillers into the polymer melt, to homogenize the melt, and to build up sufficient pressure in the melt to force the melt through forming dies at the end of the extruder barrel.

A high shear screw set for a counterrotating twin screw extruder is shown in FIG. 2. Such screws, when operated at high rotational speeds, are capable of providing 100 to 1000 times the shearing action of standard screws (such as illustrated in FIG. 1). The exact configuration of the screws may vary, and co-rotating twin screw extruders may also be configured similarly.

The high shear screw set shown in FIG. 2 has several features which increase the shearing action and thus enable the material to be compounded efficiently and effectively. These features may be added or deleted individually, and thus may be found in greater or lesser quantities on any particular extruder. However, the sum total of the effects of the individual features must be to provide shearing action at least 100, and possibly up to 1000, times the shearing action normally used in compounding and processing conventional plastics. Depending on the thermoplastic polymer being used in the lubricating composition, greater or lesser shearing action will be required.

The high shear screw set shown in FIG. 2 has raised flights 9 on screws 10 and 11 which advance the material through the extruder barrel (from right to left) when the screws are rotated. In some parts of the screws, these flights are more closely spaced and advance the material to a lesser extent in one rotation. As shown in FIG. 2, zone 1 is a feed zone in which the material is introduced to the screws from the feed throat (not shown) and compacted and transported to zone 2 (the compounding zone). In zone 2, the materials are heated and compounded by high shearing action. Table 1 summarizes the actions as follows:

TABLE 1

| Relative Shearing Action of High Shear Screws (FIG. 2) Over Conventional Screws (FIG. 1) ||
|---|---|
| Feature | Shear Factor Increase |
| 1. Side and Root Gap - High shear screws have ¼ of side and root gaps of conventional screws. | 4 |
| 2. Length - High shear screws are 28/20 times longer than conventional screws. | 1.4 |
| 3. Flight Advance - Flight advance of 6 mm per turn of high shear screws provides 5 times more shear than 30 mm per turn flight advance of conventional screws. | 5 |
| 4. Shear Elements - Ten shear elements in high shear screws provides 5 times more shear than 2 elements in conventional screws. | 5 |
| 5. Screw Filling - Gaps between flights are 50 to 70% filled, as opposed to 25% filling in conventional screws. | 2 |
| 6. Total Shear Action Increase is Product of Shear Factors: $4 \times 1.4 \times 5 \times 5 \times 2 =$ | 280 |

The closely spaced flights in zone 2 allow the gaps between the flights to be more completely filled than with conventional screws. The increased screw filling doubles the shearing action over conventional screws. The increased residence time in the zone allowed by the reduced flight advance further increases the shearing action by an estimated factor of 5. The high shear screws have reduced gap spacings between the top of one flight and the root of the mating screw and between the top of flights and the interior of the barrel. This feature increases the shearing action by a factor of 4. The high shear screws have five times the number of shear elements 12 than have conventional screws. These elements are disks which block the material advance down the barrel and require all material to pass through the narrow gap between the disk and the barrel. Shearing action is proportional to screw speed with these elements and it has been found that minimum screw speeds of from 2 to 5 times those normally employed are required for compounding the lubricating composition. This provides an additional minimum factor of 5 in the shearing action.

The screw set of FIG. 2 has a length which is 28 times the screw diameters. Conventional machines employ screws which are 20 times the screw diameter. The additional length adds an estimated factor of 1.4 to the shearing action. The product of all the factors shows that the screw set of FIG. 2 has at least 280 times the shearing action of conventional screws.

To prepare the composition, the ionomer, which can be in pellet or powder form, and any other solids to be included are metered into the feed throat of the extruder in the proper ratios. The liquid lubricant, and any liquid additives to be included ca be metered into the feed throat together with the solids or introduced into the melted solid materials at a point downstream of the feed throat.

The solids are melted and mixed in zone 2 of FIG. 2. After passing the first set of shear elements, the polymer will be thoroughly mixed with all solid and liquid ingredients. In zone 3, heat is extracted from the melted composition. The four sets of shear elements and closely spaced flights provide a shearing action which prevents the oil from separating from the polymer and aids in creating the microporous structure. It was found that extruders with conventional screw sets did not maintain the compound homogeniety during the necessary cooling process.

The shearing action is thus dependent on screw speed. When compounding ionomer polymers with lubricating oils, the minimum screw speed depends on the oil content of the composition. FIG. 4 shows the minimum screw speed necessary for homogeneous composition of du Pont Surlyn 1652 compounded with a lubricating oil ($\frac{2}{3}$ SAE 140 gear oil and $\frac{1}{3}$ polyalphaolefin) in an extruder with 38 mm diameter screws configured as shown in FIG. 2.

The molten, compounded composition is discharged from the extruder and either directed into dies which form it to the desired shape for further processing, or introduced directly into the mechanical component to be lubricated (i.e., wire rope, for example). When cooled, the composition is in its desired end form and requires no further processing. The continuous output of the extruder allows, for example, the formation of rods of the composition, which may be subsequently cut into plugs for use in journal bearings (such as shown in U.S. Pat. No. 4,342,491), the formation of strands of the composition which may be pelletized by conventional plastics processing techniques for subsequent molding or extrusion into other shapes, and/or the formation of lubricated wire rope (such as shown in U.S. Pat. No. 4,344,278).

The use of ionomers as the base polymer in the composition adds new and useful features to microporous polymer lubricants. Ionomers, because of their unique chemical structure, bond themselves readily to metal surfaces. In the present invention, this feature persists even in the presence of large amounts of lubricating oil (heretofore, the lubricating oil in the composition prevented any kind of adhesive bonding to substrates, either self-bonding or bonding with adhesives). The self-adhesion to metals of the ionomers is useful as a means of retaining the composition in the desired location in components requiring lubrication (An example of this is wire rope, wherein it is desirable to have the composition covering the exterior to provide mechanical protection and to have the composition bonded to the individual wires to provide permanancy of installation and improved protection against corrosive attack of the metal). This adhesive feature can be utilized even when the machine component is contaminated with grease and oil, adhesion is achieved even in the presence of the contaminant material (in the case of wire rope, it is neither practical nor necessary to remove all of the petroleum compound used in the rope manufacture prior to coating the rope with the composition).

In addition, the ionomer provides a composition that has excellent abrasion resistance. It is acknowledged that ionomers have superior abrasion resistance and this feature makes them useful for such items as golf ball covers and bowling pins. The abrasion resistance of the ionomer provides the composition with this property, even in the presence of the lubricating oils, and provides an extra measure of protection for the machine component being lubricated with the composition (in the case of external coatings on wire rope, the abrasion resistance provides long term protection to the rope, which is required to take advantage of the extended life of the rope resulting from the improved lubrication also offered by the composition). The abrasion resistance is particularly useful where the lubricated components are used in hostile environments (such as wire rope used in mining where the ropes may be continually dragged through rocks and dirt, and in marine mooring applications, where the abrasion resistance preserves the corrosion protection).

The use of twin screw, high shear compounding extruders at the high shear rates used to compound the oil and ionomer polymer has been found to produce a degree of homogeniety not heretofore achieved with known compounding extruders to achieve the desired structure and properties in the composition.

The use of high shear screws also allows the formation of the composition and the application of the composition to wire rope to be accomplished in a single continuous operation which is desirable for economy and efficiency of manufacture (prior art compositions must be cast and subsequently granulated to form feed stock for wire rope coating operations, and similarly, objects such as the plugs used in the journal bearings are cut from rods extruded in the same manner).

The invention is illustrated by the following examples:

EXAMPLE 1

A mixture of lubricating oil (95% of SAE 80–90 gear oil and 5% of 6 cSt polyalphaolefin synthetic oil) and pellets of an ionomer (du Pont Surlyn 1856) was made in the ratio of 60 weight percent oil and 40 percent ionomer. The mixture was drip fed into a Brabender twin screw extruder which was fitted with a stranding die. The extruder barrel was maintained at 325° F. and the die was held at 275° F. The mixture was extruded as clear, single phase strands. Upon cooling, the extrudate was a tough, flexible material, which was then pelletized in a plastics pelletizer. The extruder was then fitted with a one-half inch round rod die. The pellets were used as a feed stock and a rod of the material was extruded, which was soft and flexible. A one-half inch long section of the rod was cut and loaded axially in compression to 100 psi between two metal plates. A total of 0.302 grams of oil bled out during 336 hours under these conditions.

EXAMPLE 2

Further compositions were formed in the manner of Example 1 using lubricating oil (formed by $\frac{2}{3}$ SAE 140 gear oil and ⅓ polyalphaolefin) and an ionomer (pellets of du Pont Surlyn 1652), as follows:

| Material | Parts by Weight | | | | |
|---|---|---|---|---|---|
| | EM1 | EM2 | EM3 | EM4 | EM5 |
| Ionomer | 50 | 50 | 50 | 50 | 50 |
| Lube Oil | 75 | 60 | 75 | 75 | 75 |
| CaCO$_3$ | 50 | 50 | 50 | 25 | 50 |
| Teflon | — | — | 7 | — | — |
| LDPE | — | — | — | — | 3 |
| MoS$_2$ | — | — | 7 | 25 | — |

The compositions were extruded into ½ diameter rods and were tested for oil rejection as in Example 1. The results are shown in FIG. 3.

EXAMPLE 3

A mixture was made of lubricating oil and ionomer as in Example 1 and polypropylene powder of molecular weight 700,000 to 800,000 was added. The proportions were 60 weight percent oil, 37.5 percent ionomer and 2.5 percent polypropylene. The mixture was fed into the extruder which had temperatures of 340° F. in the barrel and 285° F. in the stranding die. The extrudate was stranded and pelletized. A one-half inch rod was subsequently extruded, which was harder than that in Example 1. The rate of oil bleed was 0.281 grams under the conditions of Example 1, which suggests that polypropylene can be used to reduce the bleed rate of the material.

EXAMPLE 4

Pellets of the material from Example 3 were fed into an extruder which was fitted with a wire coating die. Eight feet of steel wire rope core from a ⅜ inch diameter wire rope were passed through the die when the extruder was heated to 225° F. in both the barrel and die. The rope core was coated uniformly with a homogeneous, flexible material with a surface film of oil.

EXAMPLE 5

The material and conditions of Example 4 were used to coat several feet of ⅜ inch polypropylene rope, which could be used as a wire rope core. The rope was coated uniformly as in Example 3.

EXAMPLE 6

A steel core from a ⅜ inch wire rope was coated in an extruder which was fed with pellets of a compound of 60 weight percent lubricating oil (⅔ SAE 140 gear oil and ⅓ polyalphaolefin) and 40 percent ionomer (du Pont Surlyn 1652). Good coatings suitable for use in wire ropes were obtained when the extruder barrel was heated to 190° F. and the die was heated to 225° F. The coating rate was 350 to 400 feet per hour in a small Brabender extruder.

EXAMPLE 7

Three hundred sixty feet of 0.300 inch steel wire rope core were coated with pellets of the same composition as in Example 6 at a rate of 720 feet per hour with extruder temperatures of approximately 200° F. in the barrel and 230° F. in the die. The coated core diameter was 0.332 inches, which produced a net coating weight of 0.0152 pounds of material per foot of rope.

EXAMPLE 8

The materials of Example 6 were used to coat 5/16 inch diameter steel aircraft control cable. Three lengths were coated using pellets which contained 10, 20 and 30 weight percent oil. The coated cable outer diameter was 0.332 and the coatings were tough, smooth and flexible.

EXAMPLE 9

Pellets of ionomer (du Pont Surlyn 1652) and lubricating oil (95% SAE 80–90 gear oil and 5% 6 cSt polyalphaolefin) were used to make a composition which was used to coat a solid wire of 0.100 inch diameter. The wire was heated at the die entrance with a torch. The coated wire had a diameter of 0.116 inch and the coating adhered tightly to the wire.

EXAMPLE 10

Stranded wire rope of 0.113 inch diameter was coated with pellets of material from Example 6 in an extruder set at approximately 200° F. in the barrel and 230° F. in the die. The wire was heated with a torch at the die entrance to enhance adhesion. The coated rope had a diameter of 0.116 inches and the coating was smooth, tough and adherent.

EXAMPLE 11

Steel wire rope core of 0.202 inch diameter was coated with material and conditions of Example 10. The coated diameter was 0.220 inches, which produced a coating weight of 0.004 pounds of material per foot of rope.

EXAMPLE 12

Steel wire rope core of 0.254 inch diameter was coated with material and conditions of Example 10. The coated diameter was 0.274 inches, which produced a coating weight of 0.0091 pounds of material per foot of rope.

EXAMPLE 13

A composition of lubricating oil (10 weight percent oil with a viscosity of 750 cSt at 100° F.) and ionomer (du Pont Surlyn 1652) was made into pellets which were approximately ⅛ inch diameter and ⅛ inch long. These were used to test the adhesion capability of the materials under different temperature conditions. The pellets were heated on a steel plate in one oven. A bare steel plate was heated in a second oven. The plates were pressed together and allowed to cool. Adhesion was judged by the effort required to separate the plates. The results were as follows:

| Test No. | Bare Plate Temp (F.) | Pellet and Plate Temp (F.) | Adhesion |
|---|---|---|---|
| 1 | 300 | 350 | Good |
| 2 | 300 | 375 | Better than 1 |
| 3 | 300 | 400 | Same as 2 |
| 4 | room | 350 | No adhesion |
| 5 | room | 375 | Slight |
| 6 | room | 400 | Slight |
| 7 | 375 | 400 | Better than 1 |

EXAMPLE 14

Pellets of Example 13 were used to coat a steel wire rope core of 0.252 inch diameter. The core was previously coated with petrolatum, a petroleum-based material used in wire rope manufacture. The core was preheated in an oven at 375° F. for ½ hour before coating. The die was held at 375° F. and the coated cable had a diameter of 0.260 inches, producing a coating weight of 0.0064 pounds of material per foot of rope. The coating was smooth, flexible and adherent.

EXAMPLE 15

A mixture of ionomer pellets (Surlyn 1652) and calcium carbonate powder was made in the ratio of 3 parts ionomer to 1 part calcium carbonate. This mixture was fed into the feed throat of a twin screw extruder operating at 100 rpm using high shear screws similar to those shown in FIG. 2. Lubricating oil (SAE 10W-30 motor oil) was fed into the feed section of the extruder with a metering pump in the ratio of 3 parts oil to 2 parts solids (ionomer plus calcium carbonate). A ⅛ inch diameter rod was extruded which as a homogeneous solid mass with a surface film of oil. The hardness was measured to be Shore A 54.

EXAMPLE 16

A composition was formed as in Example 15 except that mica powder was used instead of calcium carbonate in the ratio of 3 parts ionomer to 1 part mica. The ratio of oil was 3 parts oil to 2 parts solids. The extrudate was a homogeneous mass with a surface film of oil and a hardness of Shore A 60.

EXAMPLE 17

A composition was formed as in Example 15 using equal parts titanium dioxide powder and ionomer pellets as the solid ingredients. Light gear oil was added at various ratios. At equal parts oil and solids, the extrudate was a hard tough solid mass with a surface film of oil. At a composition of 70 percent by weight of oil, the extrudate was a flexible, rubbery solid which easily dispensed oil. Screw speeds greater than 125 rpm were required to preserve homogeneity of the extrudate.

EXAMPLE 18

A mixture of ionomer pellets (Surlyn 1652) and glass microspheres was made in the ratio of one part microspheres by weight to ten parts ionomer. This mixture was fed into the feed throat of a 34 mm twin screw extruder configured as in FIG. 2. Lubricating oil (⅔ SAE 140 gear oil and ⅓ polyalphaolefin synthetic oil) was fed into the feed section of the extruder by a metering pump in the ratio of 3 parts oil to two parts solids. The extruder was operated at 195 rpm and two 5 mm strands were extruded. The extrudate was a soft, elastic solid which exuded oil when it was squeezed and which exhibited a reduced density over a comparable composition not containing the microspheres.

EXAMPLE 19

Pellets of ionomer (Surlyn 1652) were fed into the feed throat of a twin screw extruder configured as in FIG. 2. Lubricating oil (⅔ SAE 140 gear oil and ⅓ polyalphaolefin synthetic oil) was fed into the feed throat simultaneously in the ratio of 4 parts oil to 1 part ionomer by weight. The extruder was operated at 210 rpm and an output rate of 15 pounds per hour with a melt temperature of 220° F., extruding through a stranding die with two 5 mm diameter holes. The extrudate was a soft solid which spontaneously exuded oil as it cooled and which exuded additional oil when it was squeezed.

As can be appreciated from the foregoing, this invention provides an improved microporous polymer lubricating composition which includes a polymer matrix formed from an ionomer polymer and a liquid lubricant within the polymer matrix.

What is claimed is:

1. A lubricating composition, comprising:
    a microporous carrier having a polymer matrix formed from an ionomer polymer wherein said ionomer polymer has a melt flow index between about 0.5 and 10.0 grams per minutes; and
    a liquid lubricant within said carrier.

2. A lubricating composition, comprising:
    a microporous carrier having a polymer matrix formed from an ionomer polymer from the group consisting of a terpolymer of isobutylacrylate, methacrylic acid and ethylene and a copolymer of ethylene and methacrylic acid; and
    a liquid lubricant within said carrier.

3. The composition of claim 2 wherein said copolymer of ethylene and methacrylic acid has one of a sodium ion linkage and a zinc ion linkage.

4. The composition of claim 1 wherein said polymer matrix is formed from an alloy of said ionomer polymer and a second polymer.

5. The composition of claim 4 wherein said second polymer is one of polyethylene and polypropylene.

6. The composition of claim 1 wherein said microporous carrier comprises between about 20 and 90 percent by weight and said liquid lubricant comprises between about 10 and 80 percent by weight.

7. The composition of claim 1 wherein said microporous carrier comprises between about 60 to 75 percent by weight and said liquid lubricant comprises between about 25 to 40 percent by weight.

8. The composition of claim 1 wherein said liquid lubricant is selected from the group consisting of a hydrocarbon, diester and silicone oil of lubricating viscosity.

9. The composition of claim 1 wherein said composition also includes at least one of solid and liquid additives.

10. The composition of claim 9 wherein said solid additives are selected from the group consisting of calcium carbonate, mica, titanium dioxide, molybdenum disulfide, polytetrafluoroethylene, nylon and hollow glass beads.

11. The composition of claim 10 wherein said solid additives comprise between about 5 percent to 50 percent by weight of said ionomer polymer.

12. The composition of claim 9 wherein said additives are selected from the group consisting of fibers of glass, graphite, minerals, polymers and organic materials.

13. The composition of claim 12 wherein said solid additives comprise between about 1 to 25 percent by weight of said ionomer polymer.

14. A lubricating composition, comprising:
    a microporous carrier having a polymer matrix formed from an ionomer polymer having a melt flow index between about 0.5 and 10.0 grams per 10 minutes;
    at least one of solid and liquid additivies; and
    a liquid lubricant within said carrier, said liquid lubricant being an oil of lubricating viscosity.

15. The composition of claim 14 wherein said polymer matrix is formed from an alloy of said ionomer polymer and a second polymer with said second polymer being one of polyethylene and polypropylene.

16. The composition of claim 14 wherein said microporous carrier comprises between 90 percent to less than 20 percent by weight and said liquid lubricant comprises between 10 to 80 percent by weight.

17. The composition of claim 14 wherein said oil is selected from the group consisting of a hydrocarbon, diester and silicone oil.

18. The composition of claim 14 wherein said additives are selective from the group consisting of calcium carbonate, mica, titanium dioxide, molybdenum disulfide, polytetrafluoroethylene, nylon, hollow glass beads, fibers of glass, graphite, minerals, polymers and organic material.

19. A lubricating composition, comprising: a microporous carrier having a polymer matrix formed from an ionomer polymer, said polymer being selected from the group consisting of a terpolymer of isobutylacrylate, methacrylic acid and ethylene and a copolymer of ethylene and methacrylic acid, with a melt flow index between about 0.5 and 10.0 grams per 10 minutes, and comprising between about 20 to 90 percent by weight;

at least one of solid and liquid additives with said additives being selected from the group consisting of calcium carbonate, mica, titanium dioxide, molybdenum disulfide, polytetrafluoroethylene, nylon, hollow glass beads, fibers of glass, graphite, minerals, polymers and organic materials; and a liquid lubricant within said carrier, said liquid lubricant being selected from the group consisting of a hydrocarbon, diester and silicone oil of lubricating viscosity, with said liquid lubricant comprising between about 10 to 80 percent by weight.

20. A process for lubricating a mechanical component utilizing a microporous ionomer polymer lubricating composition, said process comprising:

providing a microporous ionomer polymer lubricating composition; and applying said microporous ionomer polymer lubricating composition to a mechanical component.

21. The process of claim 20 wherein said microporous ionomer polymer lubricating composition is provided by providing a microporous carrier having a polymer matrix formed from an ionomer polymer with said carrier having a liquid lubricant therein.

22. The process of claim 20 wherein said microporous ionomer polymer lubricating composition is applied to wire rope as the mechanical component to be lubricated.

23. A process for lubricating wire rope, said process comprising:

forming a microporous ionomer polymer lubricating composition from an ionomer polymer and a liquid lubricant; and applying said microporous ionomer polymer lubricating composition to wire rope to lubricate said wire rope.

* * * * *

UNITED STATES PATENT AND TRADEMARK OFFICE
CERTIFICATE OF CORRECTION

PATENT NO. : 4,486,319

DATED : December 4, 1984

INVENTOR(S) : Jamison

It is certified that error appears in the above—identified patent and that said Letters Patent is hereby corrected as shown below:

Column 5, line 12, delete "ca" and insert --can--.

Column 10, line 11, after "per" insert --10--.

Signed and Sealed this

Tenth Day of December 1985

[SEAL]

Attest:

DONALD J. QUIGG

Attesting Officer

Commissioner of Patents and Trademarks